United States Patent
Jia et al.

(10) Patent No.: US 10,643,378 B2
(45) Date of Patent: May 5, 2020

(54) METHOD AND DEVICE FOR MODELLING THREE-DIMENSIONAL ROAD MODEL, AND STORAGE MEDIUM

(71) Applicant: Baidu Online Network Technology (Beijing) Co., Ltd., Beijing (CN)

(72) Inventors: Xiangfei Jia, Beijing (CN); Yang Yan, Beijing (CN); Ruisuo Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/750,122

(22) PCT Filed: Dec. 7, 2015

(86) PCT No.: PCT/CN2015/096522
§ 371 (c)(1),
(2) Date: Feb. 2, 2018

(87) PCT Pub. No.: WO2017/020465
PCT Pub. Date: Feb. 9, 2017

(65) Prior Publication Data
US 2018/0232946 A1 Aug. 16, 2018

(30) Foreign Application Priority Data
Aug. 3, 2015 (CN) .......................... 2015 1 0481925

(51) Int. Cl.
*G06T 17/05* (2011.01)
*G06K 9/00* (2006.01)
(Continued)

(52) U.S. Cl.
CPC .............. *G06T 17/05* (2013.01); *G01C 21/32* (2013.01); *G06F 16/29* (2019.01);
(Continued)

(58) Field of Classification Search
None
See application file for complete search history.

(56) References Cited

U.S. PATENT DOCUMENTS

| 2002/0070934 A1* | 6/2002 | Sakamoto | G01C 21/3638 345/419 |
| 2005/0140676 A1* | 6/2005 | Cho | G01C 21/3635 345/440 |

(Continued)

FOREIGN PATENT DOCUMENTS

| CN | 1938738 A | 3/2007 |
| CN | 103234547 A | 8/2013 |

(Continued)

OTHER PUBLICATIONS

Y. Shi, R. Shibasaki, Z.C. Shi, Towards Automatic Road Mapping by Fusing Vehicle-Borne Multi-Sensor Data, 2008, The International Archives of the Photogrammetry, Remote Sensing and Spatial Information Sciences, vol. 37, part B5, pp. 867-872 (Year: 2008).*
(Continued)

*Primary Examiner* — Michael J Cobb
(74) *Attorney, Agent, or Firm* — Knobbe, Martens, Olson & Bear, LLP

(57) ABSTRACT

The present disclosure provides a method and device for modelling a three-dimensional road model, and a storage medium. The method comprises: parsing two-dimensional road network data to establish a rudimentary road model; parsing panoramic image data to obtain three-dimensional attribute data of a traffic element; and combining the rudimentary model and the three-dimensional attribute data to obtain a three-dimensional road model. The method, device and storage medium can economically and efficiently acquire a three-dimensional road model based on a relatively easily obtained data source.

9 Claims, 8 Drawing Sheets

(51) Int. Cl.
| | | |
|---|---|---|
| *G06K 9/62* | (2006.01) | |
| *G01C 21/32* | (2006.01) | |
| *G06F 16/29* | (2019.01) | |
| *G06N 20/00* | (2019.01) | |
| *G06T 7/73* | (2017.01) | |
| *G06N 3/08* | (2006.01) | |
| *G01C 11/02* | (2006.01) | |
| *G01C 21/36* | (2006.01) | |

(52) U.S. Cl.
CPC ..... *G06K 9/00651* (2013.01); *G06K 9/00798* (2013.01); *G06K 9/00818* (2013.01); *G06K 9/00825* (2013.01); *G06K 9/627* (2013.01); *G06N 20/00* (2019.01); *G06T 7/75* (2017.01); *G01C 11/02* (2013.01); *G01C 21/3635* (2013.01); *G06K 9/00785* (2013.01); *G06N 3/08* (2013.01)

(56) References Cited

U.S. PATENT DOCUMENTS

| | | | |
|---|---|---|---|
| 2007/0200845 | A1 | 8/2007 | Kumagai et al. |
| 2008/0036758 | A1 | 2/2008 | Carpenter et al. |
| 2010/0045662 | A1* | 2/2010 | Boothroyd ............ G06F 16/972 345/419 |
| 2010/0250125 | A1 | 9/2010 | Kristian et al. |
| 2012/0256915 | A1* | 10/2012 | Jenkins ................ G06T 15/40 345/419 |
| 2013/0222364 | A1* | 8/2013 | Kraus .................. G06Q 30/02 345/419 |
| 2014/0247279 | A1* | 9/2014 | Nicholas .............. G06T 19/006 345/633 |
| 2014/0285523 | A1* | 9/2014 | Gruenler .............. G06T 19/006 345/633 |
| 2015/0341552 | A1* | 11/2015 | Chen .................. H04N 5/23238 348/38 |
| 2016/0202076 | A1* | 7/2016 | Feng .................... G01C 21/343 701/408 |
| 2016/0248904 | A1* | 8/2016 | Duvaut ............. H04M 1/72577 |
| 2016/0252363 | A1* | 9/2016 | Tertoolen ........... G06K 9/00798 701/410 |
| 2017/0010125 | A1* | 1/2017 | Adachi ................ B60L 53/65 |
| 2017/0057497 | A1* | 3/2017 | Laur ................. B60W 30/0953 |
| 2019/0197704 | A1* | 6/2019 | Okubo ................ G06T 7/251 |
| 2019/0370565 | A1* | 12/2019 | Shen ................. G06K 9/00798 |

FOREIGN PATENT DOCUMENTS

| | | |
|---|---|---|
| CN | 104280036 A | 1/2015 |
| CN | 104766058 A | 7/2015 |
| CN | 105069842 A | 11/2015 |
| CN | 105096386 A | 11/2015 |
| JP | 2002-259952 A | 9/2002 |
| JP | 4273119 B2 | 6/2009 |
| JP | 2009-163650 A | 7/2009 |
| WO | 2014078979 A1 | 5/2014 |

OTHER PUBLICATIONS

Xiaozhi Qu, Bahman Soheilian, Nicolas Paparoditis, Vehicle Localization Using Mono-Camera and Geo-Referenced Traffic Signs, Jun. 28-Jul. 1, 2015, IEEE Intelligent Vehicle Symposium (IV 2015), pp. 605-610, Seoul, South Korea (Year: 2015).*

International Search Report dated May 10, 2016 for International Application No. PCT/CN2015/096522, 6 pages.

Written Opinion of the International Searching Authority dated May 10, 2016 for International Application No. PCT/CN2015/096522, 4 pages.

Kim, et al., "Robust Lane Detection Based on Convolutional Neural Network and Random Sample Consensus," School of Electronics Engineering, Kyungpook National University, ICONIP 2014, Part I, LNCS 8834, pp. 454-461.

Wendel, et al., "Automatic Alignment 3d Reconstructions using a Digital Surface Model," Conference: Computer Vision and Pattern Recognition Workshops (CVPRW), 2011 IEEE Computer Society Conference.

Park, et al., "Traffic sign recognition with Convolution Neural Network," Dept. of Control and Automation of Mechanical Engineering, Pusan Nat'l Univ., KSME 15DC-Th01PA04, 2015, in 3 pages.

Welzel, et al., "Accurate Camera-based Traffic Sign Localization," 2014 IEEE 17th International Conference on Intelligent Transportation Systems (ITSC), Oct. 8-11, 2014, Qingdao, China, 6 pages, XP032685967A.

Kim, et al., "Automatic 3D City Modeling Using a Digital Map and Panoramic Images from a Mobile Mapping System," Hindawi Publishing Corporation, Mathematical Problems in Engineering, vol. 2014, Article ID283270, 10 pages, XP055633885A.

* cited by examiner

METHOD AND DEVICE FOR MODELLING THREE-DIMENSIONAL ROAD MODEL, AND STORAGE MEDIUM

CROSS-REFERENCE TO RELATED APPLICATION

This application is the U.S. National Phase Application under 35 U.S.C. § 371 of International Application No. PCT/CN2015/096522 filed on Dec. 7, 2015, designating the U.S. and published as WO 2017/020465 A1 on Feb. 9, 2017, which claims the benefit of Chinese Application No. 201510481925.7, filed on Aug. 3, 2015, entitled "Method and Device for Modeling Three-dimensional Road Model," having Baidu Online Network Technology (Beijing) Co., Ltd. as the applicant, the entire disclosures of which are incorporated herein by reference.

TECHNICAL FIELD

Embodiments of the present application relate to the field of position-based service technology, and in particular to a method and device for modelling a three-dimensional road model, and a storage medium.

BACKGROUND

As a graphic language form for recording geographical information, electronic maps provide great convenience when one travels. However, the traditional map products are all two-dimensional, and have limitations in practical application. For example, on the actual road, there exist complex road sections such as overpasses, deep grooved sections, tunnels and so on. Those complex road sections criss-cross in space, which is difficult to be presented by two-dimensional maps. In addition, the expression form of two-dimensional maps is not intuitive, leading to difficulties in understanding.

As computer graphics, three-dimensional simulation technologies, virtual reality technologies and network communication technologies develop rapidly, the traditional two-dimensional electronic maps are revived. As a result, Internet based three-dimensional electronic maps are becoming important trend in developing the electronic maps. Three-dimensional electronic maps provide users with map functions such as map query, trip navigation by intuitively simulating real geographies. In addition, more interactions and colourful rendering techniques can be realised using the three-dimensional maps, providing more imagination room for more relevant products.

The methods for establishing three-dimensional road models in the existing three-dimensional maps may be divided into two approaches: namely an artificial modeling approach, and an automatic modeling approach. The artificial modeling approach refers to manually plotting three-dimensional road models using a three-dimensional drawing software with reference to satellite or aerial images. Clearly, this modelling approach is not highly efficient. The automatic modeling approach refers to scanning areas to be modeled using aircraft-mounted or car-mounted professional sampling devices such as cameras or radars, and automatically modelling the scanned data. Although the automatic modeling approach have an improved efficiency, the cameras and the radars are expensive. In addition, the cost of performing such scanning is high. Therefore, the cost of the automatic modeling approach concerns a majority of the electronic map developers.

SUMMARY

In view of the above technical problems, embodiments of the present disclosure provide a method and device for modelling a three-dimensional road model and a storage medium to economically and efficiently establish a three-dimensional road model.

In a first aspect, an embodiment of the present disclosure provides a method for modelling a three-dimensional road model, and the method comprising:

parsing two-dimensional road network data to establish a rudimentary road model;

parsing panoramic image data to obtain three-dimensional attribute data of a traffic element; and combining the rudimentary model and the three-dimensional attribute data to obtain a three-dimensional road model.

In a second aspect, an embodiment of the present disclosure further provides a device for modelling a three-dimensional road model, and the device comprising:

a road network parsing module, parsing two-dimensional road network data to establish a rudimentary road model;

a panoramic image parsing module, parsing panoramic image data to obtain three-dimensional attribute data of a traffic element; and a data combination module, combining the rudimentary model and the three-dimensional attribute data to obtain a three-dimensional road model.

In a third aspect, an embodiment of the present disclosure also provides one or more storage media containing computer-executable instructions that execute a method for modelling a three-dimensional road model when executed by a computer processor, and the method comprising following steps:

parsing two-dimensional road network data to establish a rudimentary road model;

parsing panoramic image data to obtain three-dimensional attribute data of a traffic element; and combining the rudimentary model and the three-dimensional attribute data to obtain a three-dimensional road model.

A method and device modelling for a three-dimensional road model and a storage medium provided by embodiments of the present disclosure can economically and efficiently acquire a three-dimensional road model based on a relatively easily obtained data source by parsing two-dimensional road network data to establish a rudimentary road model, parsing panoramic image data to obtain three-dimensional attribute data of a traffic element and combining the rudimentary model and the three-dimensional attribute data to obtain a three-dimensional road model.

BRIEF DESCRIPTION OF THE DRAWINGS

In order to provide a better explanation of the technical solution in the embodiments of the present disclosure, drawings used in the description of the embodiments will be briefly described. Clearly, the drawings in the following description are merely some embodiments of the present disclosure, those skilled in the art will be able to modify and substitute these drawings without creative effort.

DETAILED DESCRIPTION OF EMBODIMENTS

The technical solution provided by the embodiments of the present disclosure will be clearly and completely described below with reference to the accompanying drawings. Evidently, the described embodiments are some of the embodiments of the present disclosure, but not all embodiments of the present disclosure. The described embodiments are intended to illustrate the principles of the present disclosure and are not intended to limit the present disclosure to these specific embodiments. All other embodiments obtained by those skilled in the art without making creative effort are within the scope of the present disclosure, based on the embodiments in the present disclosure.

First Embodiment

The present embodiment provides a technical solution of a method for modelling a three-dimensional road model. The method for modelling a three-dimensional road model is performed by a device for modelling a three-dimensional road model. The device for modelling a three-dimensional road model may be integrated in a computing device using a personal computer, a workstation or a server and so on.

Figure 1:
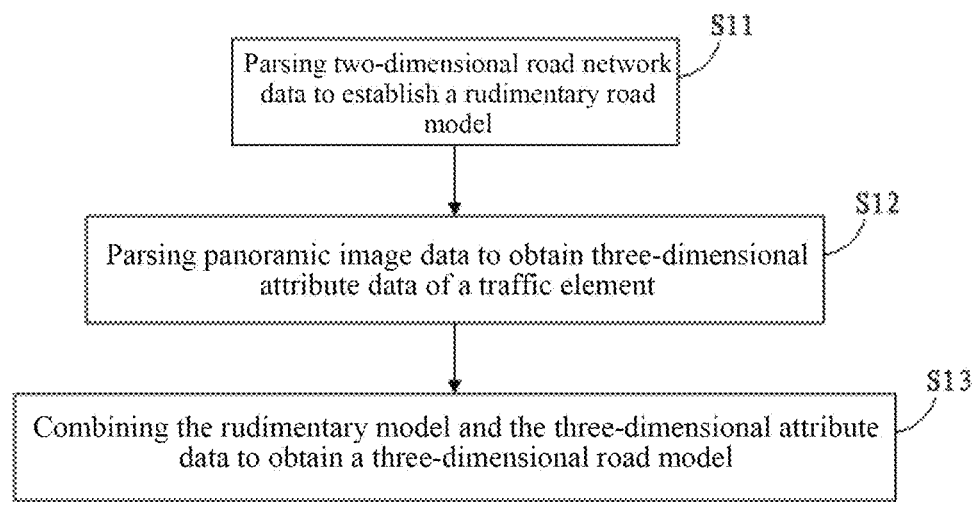
FIG. 1 is a flowchart of a method for modelling a three-dimensional road model provided by the first embodiment of the present disclosure.

Referring to FIG. 1, a method for modelling a three-dimensional road model comprises:

S11: parsing two-dimensional road network data to establish a rudimentary road model.

The two-dimensional road network data refers to two-dimensional image data from which a road network distribution can be seen. Specifically, the two-dimensional road network data may be an aerial image of the road network, or an satellite image of the road network. Preferably, the two-dimensional road network data may also be a photograph formed by stacking an aerial image and road network data in an electronic map.

Figure 2:
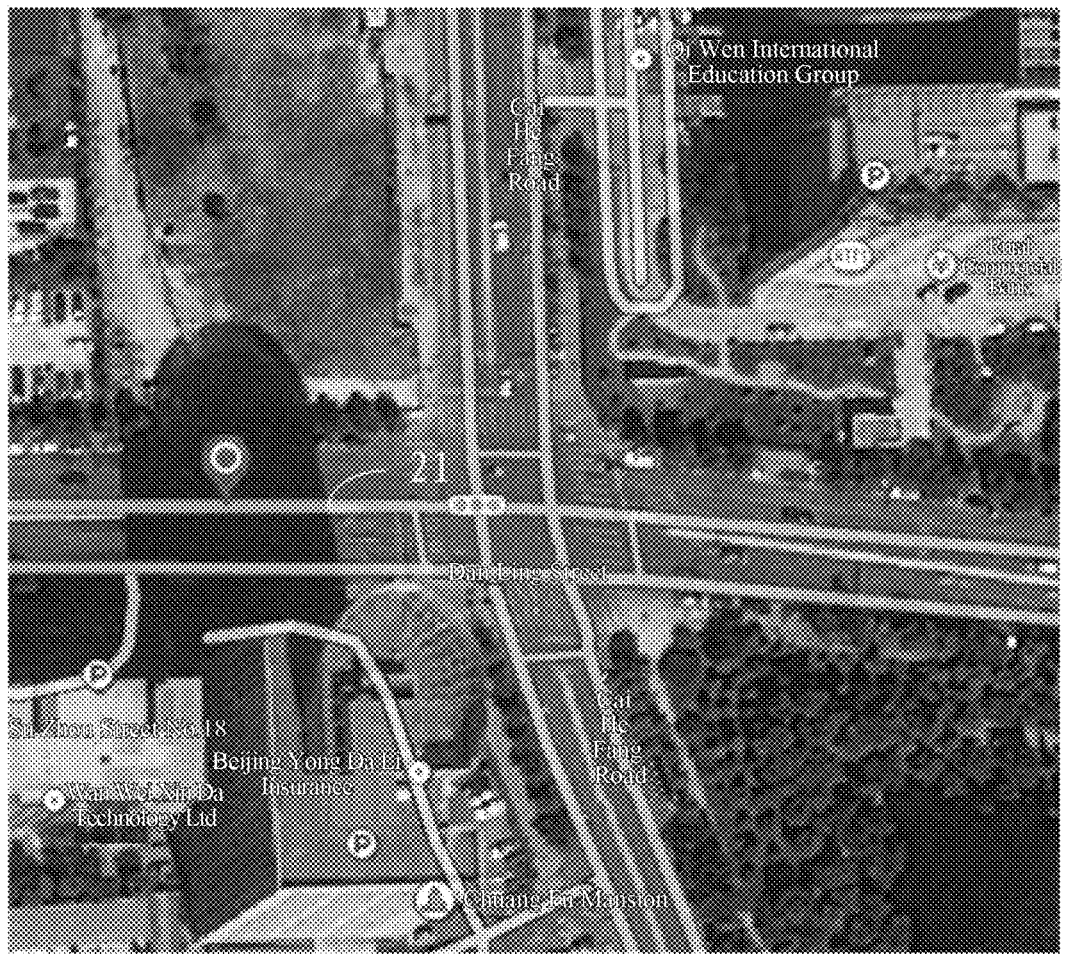
FIG. 2 is a stacking image of a satellite image and road network data provided by the first embodiment of the present disclosure.

FIG. 2 shows an example of the two-dimensional road network data formed by stacking the satellite image of the road network distribution and road network data. Referring to FIG. 2, the direction and the boundary of each road can be clearly seen from the superimposed photograph, and various buildings on both sides of the road can also be seen.

Solid lines 21 in FIG. 2 are road network data superimposed in the electronic map on the photograph. The road network data may be obtained based on travelling tracks of different vehicles.

A rudimentary road model may be obtained by parsing various kinds of the two-dimensional road network data. Specifically, respective geographic positions of a road boundary line, a median divider boundary line, a road center line, and a lane line may be obtained by parsing the two-dimensional road network data.

Figure 3:
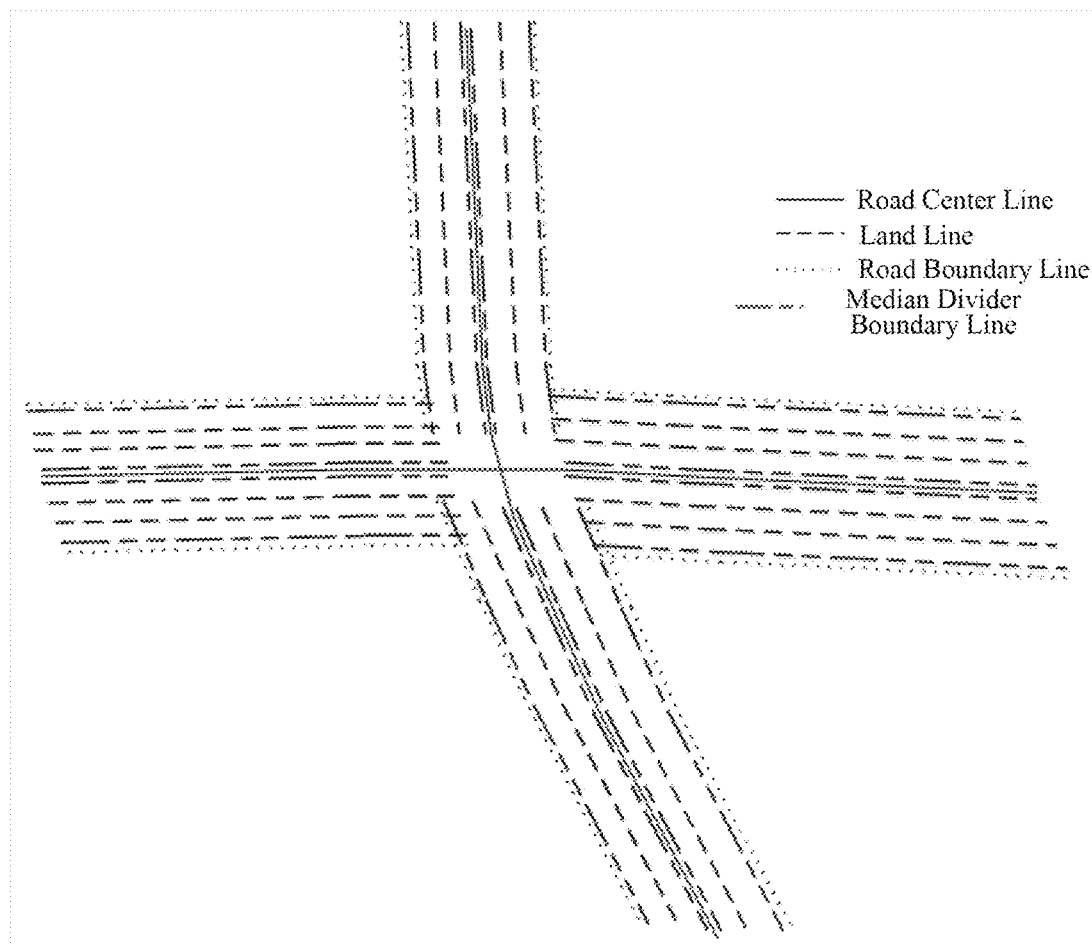
FIG. 3 is a diagram of a rudimentary model provided by the first embodiment of the present disclosure.
Figure 4:
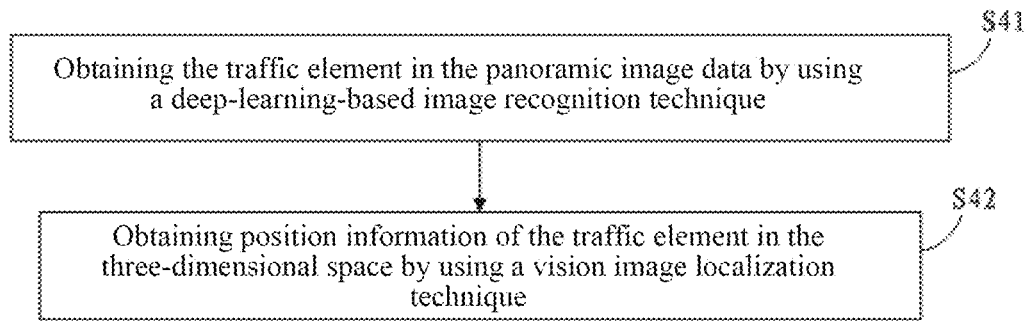
FIG. 4 is a flowchart of panoramic image parsing in a method for modelling a three-dimensional road model provided by a second embodiment of the present disclosure.

FIG. 3 shows a rudimentary road model obtained by parsing two-dimensional road network data in FIG. 2. Referring to FIG. 3, in the rudimentary model, the road boundary line, the median divider boundary line, the road center line, the lane line already have defined positions.

S12: parsing panoramic image data to obtain three-dimensional attribute data of a traffic element.

The panoramic image data may be the panoramic image data collected when the vehicle travels on the road. It is to be understood that the panoramic image data includes a plurality of traffic elements when traveling. For example, lane lines on the road, traffic signs, indicating lines and traffic lights. Three-dimensional attribute data of the traffic elements may be obtained from the panoramic image data by parsing the panoramic image data. The three-dimensional attribute data mainly comprises three-dimensional position coordinates.

Preferably, the three-dimensional attribute data of the traffic element may be obtained by a deep learning technique and a vision localization technique.

S13: combining the rudimentary model and the three-dimensional attribute data to obtain a three-dimensional road model.

In general, position data in the rudimentary model shows the basic position of the described road, and the three-dimensional attribute data of the traffic element is more precise position data. Therefore, the combining the rudimentary model and the three-dimensional attribute data more refers to correcting imprecise position data in the rudimentary model using the three-dimensional attribute data of the traffic element. Certainly, such combination may also comprise import of the three-dimensional attribute data of the traffic element.

According to the present embodiment, the three-dimensional road model may be obtained economically and efficiently based on a relatively easily obtained data source by parsing the two-dimensional road network data to establish the rudimentary road model, parsing the panoramic image data to obtain the three-dimensional attribute data of the traffic element, and combining the rudimentary model and the three-dimensional attribute data to obtain the three-dimensional road model.

Second Embodiment

The present embodiment further provides a technical solution of the panoramic image parsing in a method for modelling a three-dimensional road model based on the above-described embodiment of the present disclosure. In the technical solution, the parsing panoramic image data to obtain three-dimensional attribute data of a traffic element comprises: obtaining a traffic element in the panoramic image data by using the deep-learning-based image recognition technique, the traffic element comprising the lane line, the traffic sign, the indicating line and the traffic light; and obtaining position information of the traffic element in the three-dimensional space by using the vision image localization technique.

S41: obtaining the traffic element in the panoramic image data by using the deep-learning-based image recognition technique.

Preferably, a deep neural network may be trained using a sample image of the collected traffic sign in advance. The different traffic elements such as the traffic signs from the panoramic image data are recognized based on the trained deep neural network. Specifically, after inputting the sample image into the deep neural network, the deep neural network may recognize the position area of the different traffic element in the sample image and the type of the traffic element included in the position area. For example, if the inputted image contains a traffic element such as a lane line, after inputting the image into the deep neural network, the deep neural network may recognize the position area of the lane line in the panoramic image and the type of the traffic element corresponding to the position area is the lane line.

S42: obtaining the position information of the traffic element in the three-dimensional space by using the vision image localization technique.

After using the deep learning technique to obtain the traffic element in the panoramic image data, using the vision image localization technique to determine the position of the obtained traffic element in the three-dimensional space. Preferably, a set of boundary points of the traffic element in the panoramic image may be obtained in advance. The position information of the boundary points in the three-dimensional space is determined based on the vision image localization technique. The position of the traffic element in the three-dimensional space is finally determined based on the position information of the boundary points in the three-dimensional space.

Figure 5:
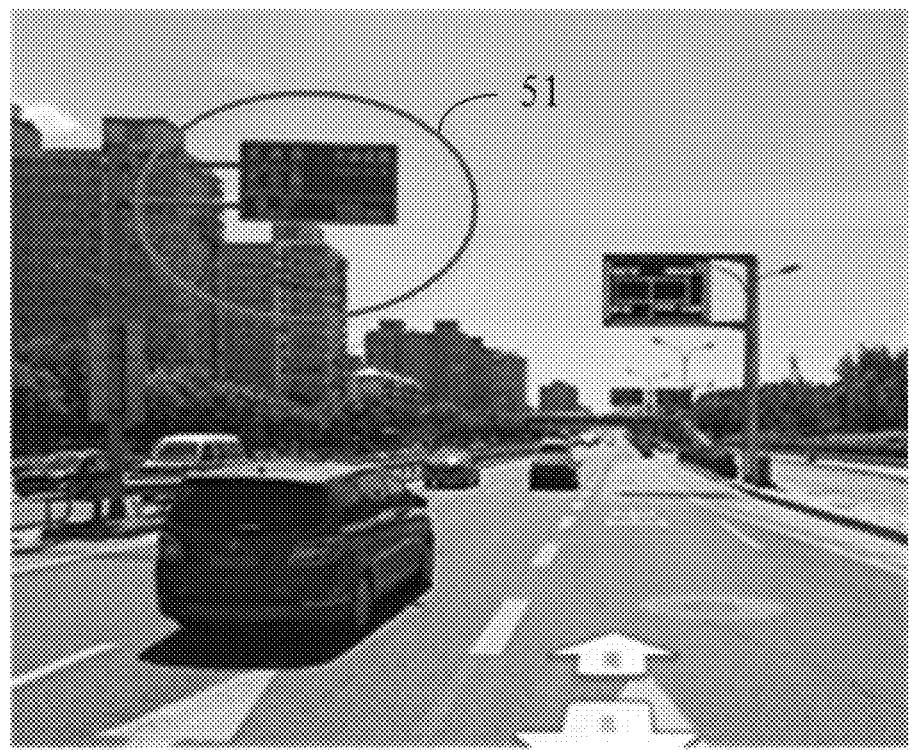
FIG. 5 is a panoramic image provided by the second embodiment of the present disclosure.
Figure 6:
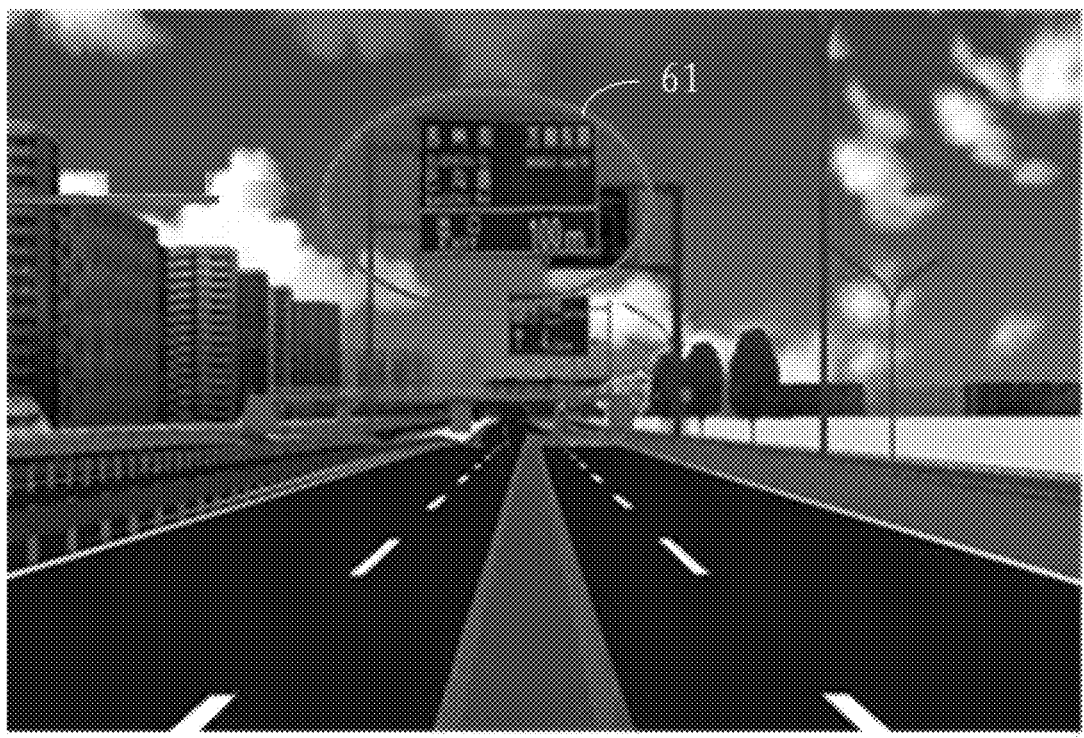
FIG. 6 is a diagram of a traffic element according to the panoramic image parsing provided by the second embodiment of the present disclosure.

FIGS. 5 and 6 respectively show a panoramic image before recognizing the traffic element and a three-dimensional image including the recognized traffic element after recognizing the traffic element. Referring to FIGS. 5 and 6, a traffic sign 51 in the panoramic image and the position of the traffic sign 51 may be accurately recognized by recognizing the traffic element. After the traffic sign 51 and its position are obtained by the recognition, the traffic sign 61 may be accurately displayed in the three-dimensional image.

According to the present embodiment, the traffic element in the panoramic image data may be obtained by using the deep-learning-based image recognition technique. In addition, the position information of the traffic element in the three-dimensional space may be obtained by using the vision image localization technique so as to achieve the accurate recognition of the traffic elements and their positions in the panoramic image.

Third Embodiment

The present embodiment further provides a technical solution of combining data in the method for modelling a three-dimensional road model based on the above-described embodiments of the present disclosure. In the technical solution, the combining the rudimentary model and the three-dimensional attribute data to obtain a three-dimensional road model comprises: using the three-dimensional attribute data to transform the position data in the rudimentary model into three-dimensional data; using the position data in the three-dimensional attribute data to correct the position data in the rudimentary model; rebuilding the three-dimensional model based on the combined three-dimensional data to obtain the three-dimensional model data of the road.

Figure 7:
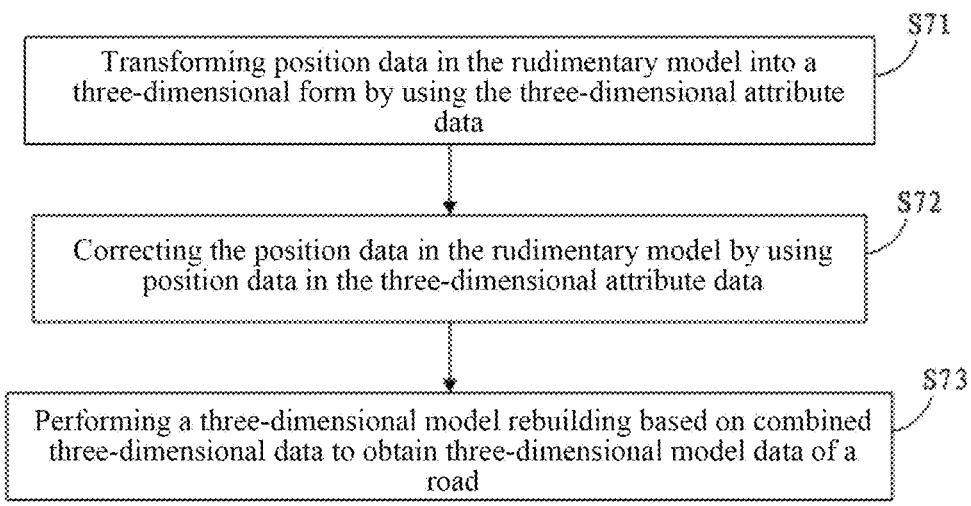
FIG. 7 is a flowchart of data combination in a method for modelling a three-dimensional road model provided by a third embodiment of the present disclosure.

Referring to FIG. 7, the combining the rudimentary model and the three-dimensional attribute data to obtain the three-dimensional road model comprises:

S71, using the three-dimensional attribute data to transform the position data in the rudimentary model into three-dimensional data.

It should be appreciated that the position data in the rudimentary model is transformed into three-dimensional data, namely, height data is added to each of the position points in the rudimentary model. The addition of the height data may refer to the three-dimensional attribute data. For example, in the operation of recognizing the traffic element, if it is determined that the height of the lower edge of a traffic sign from the road surface is 10 meters by the vision image localization technique, it can be determined that, in the transformed data into three-dimensional data, the height of the lower edge of the traffic sign from the road surface is 10 meters.

S72: using the position data in the three-dimensional attribute data to correct the position data in the rudimentary model.

As described above, the position data in the rudimentary model may have relative large deviation. In comparison, the position data recognized from the panoramic image has higher data accuracy. Therefore, the position data in the rudimentary model may be corrected using the position data in the three-dimensional attribute data so that the transformed position data into three-dimensional data included in the rudimentary model also has higher data accuracy.

S73: rebuilding the three-dimensional model based on the combined three-dimensional data to obtain the three-dimensional model data of the road.

In particular, the rebuilding of the three-dimensional model Specifically comprises the rebuilding of the profile of the three-dimensional model and the operation of pasting texture of the rebuilt three-dimensional model. After finishing pasting texture of the rebuilt three-dimensional model, vivid three-dimensional model data of the road is formed.

Figure 8:
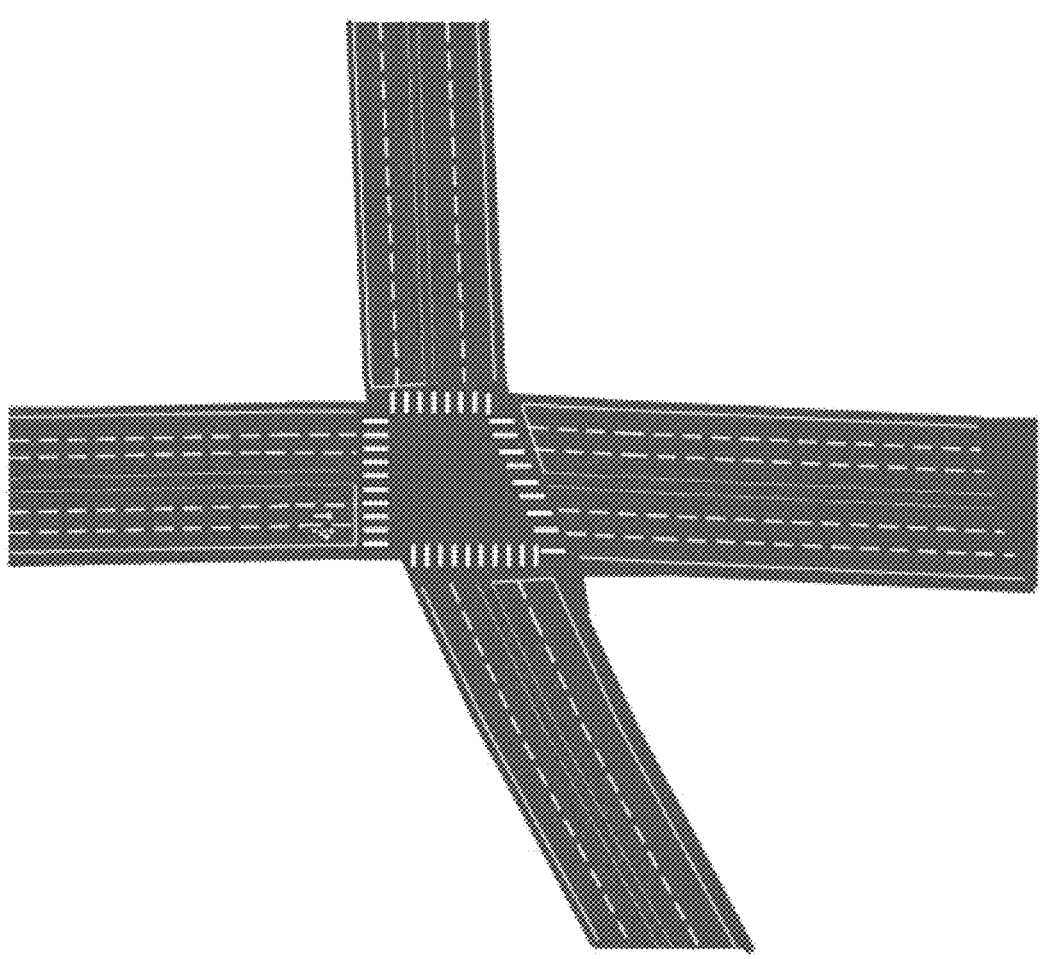
FIG. 8 is a diagram of a rudimentary model provided by the third embodiment of the present disclosure.
Figure 9:
FIG. 9 is a diagram of a three-dimensional model provided by the third embodiment of the present disclosure.

FIG. 8 shows the rudimentary road model before the three-dimensional modelling. FIG. 9 shows the three-dimensional road model after the three-dimensional modelling. Clearly, the three-dimensional road model looks more intuitive, and the user is more willing to use.

Clearly, various rendering techniques may be used on the rebuilt three-dimensional model, making the three-dimensional road model more realistic.

The present embodiment achieved establishing the three-dimensional road model by means of data combination, improving the efficiency of the modelling and reducing the cost of the modelling by using the three-dimensional attribute data to transform the position data in the rudimentary model into three-dimensional data, using the position data in the rudimentary model to correct the position data in the rudimentary model and rebuilding the three-dimensional model based on the combined three-dimensional data to obtain the three-dimensional model data of the road.

Fourth Embodiment

The present embodiment further provides a technical solution of a method for modelling a three-dimensional road model based on the above-described embodiments of the present disclosure. In the technical solution, after combining the rudimentary model and the three-dimensional attribute data to obtain a three-dimensional road model, the three-dimensional model data is converted into pre-set model data format.

Figure 10:
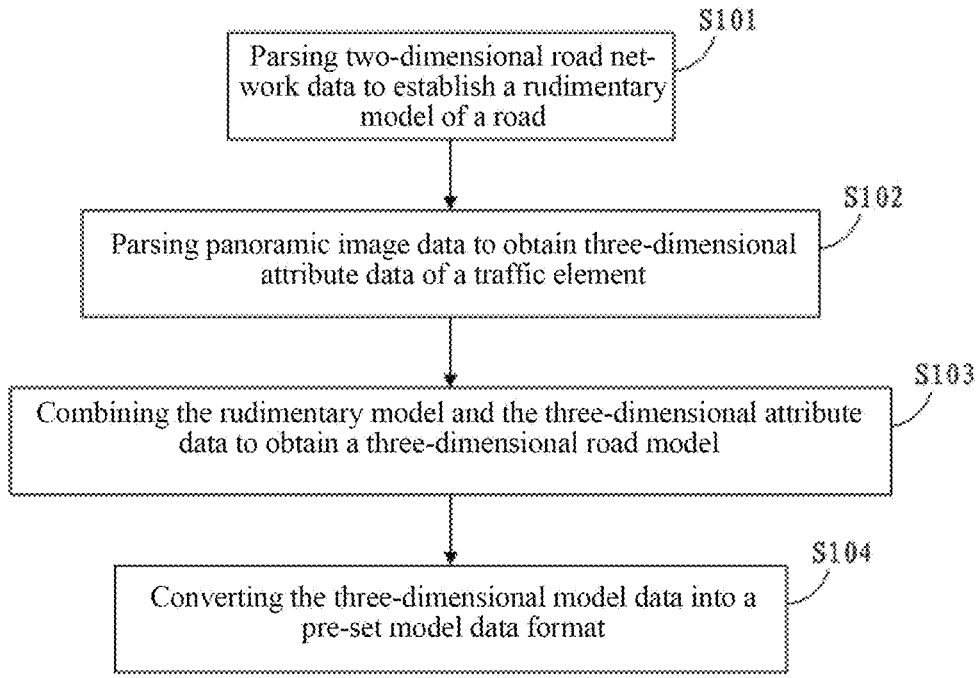
FIG. 10 is a flowchart of a method for modelling a three-dimensional road model provided by a fourth embodiment of the present disclosure.

Referring to FIG. 10, the method for modelling the three-dimensional road model comprises:

S101: parsing the two-dimensional road network data to establish the rudimentary road model.

S102: parsing the panoramic image data to obtain the three-dimensional attribute data of the traffic element.

S103: combining the rudimentary model and the three-dimensional attribute data to obtain the three-dimensional road model.

S104: converting the three-dimensional model data into the pre-set model data format.

Different model data formats for three-dimensional model data are used on different navigation platforms. After the three-dimensional road model is established, the established three-dimensional model data is converted into the pre-set model data format to adapt to the application requirements of different navigation platforms. For example, the established three-dimensional model data may be converted into collada data format.

The present embodiment facilitates the use of the three-dimensional model data on different navigation platforms by converting the three-dimensional model data into the pre-set model data format after combining the rudimentary model and the three-dimensional attribute data so that the three-dimensional model data may be applied to different navigation application platforms.

Fifth Embodiment

Figure 11:
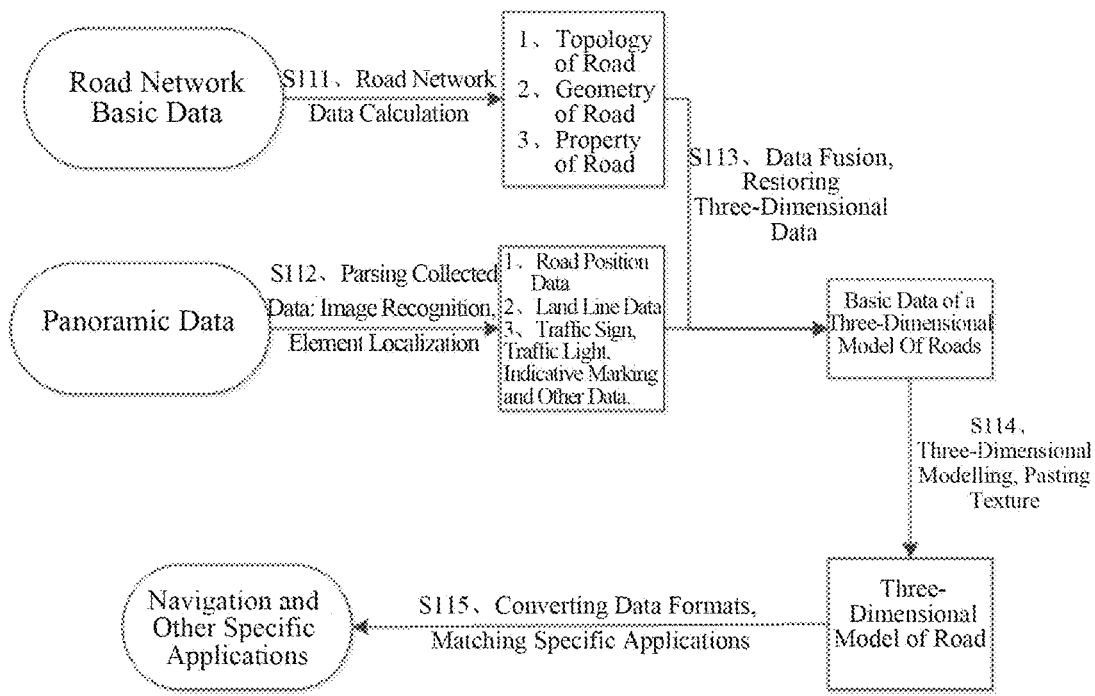
FIG. 11 is a flow diagram of a method for modelling a three-dimensional road model provided by a fifth embodiment of the present disclosure.

The present embodiment provides a technical solution of a method for modelling a three-dimensional road model. Referring to FIG. 11, in the technical solution, the method for modelling the three-dimensional road model comprises:

S111: a rudimentary road model is obtained by parsing road network basic data.

Specifically, the rudimentary model includes topology of road network, geometry of roads and specific properties of roads. For example, the road is a municipal road or a provincial highway, a national highway.

S112: position data of a traffic element is obtained by parsing panoramic image data.

The traffic elements include the road itself, and the elements such as a lane line, a traffic sign, a traffic light is critical to the traffic.

S113: basic data of a three-dimensional road model is restored by combination of the rudimentary model and the position data of the traffic element.

The combination comprises transforming initial model into three-dimensional data and correcting position data of the initial model based on the position data of the traffic element S114: the three-dimensional road model is obtained by rebuilding of the model according to the basic data of the three-dimensional model.

The rebuilding of the model refers to rebuilding the three-dimensional road model according to the basic data of the three-dimensional model. Specifically, it may comprise the rebuilding of the road and the profile of the buildings on both sides of the road as well as the operation of pasting texture of the profile of the rebuilt road, buildings.

S115: the three-dimensional model is adapted to the specific navigation application by converting a data format of the three-dimensional model.

Specifically, the three-dimensional model data may be converted into collada data format.

The present embodiment provides the economical and efficient modelling of the three-dimensional road model based on a relatively easily obtained data source by parsing the road network basic data to obtain the rudimentary road model, parsing the panoramic image to obtain the position data of the traffic element, combining the rudimentary model and the position data of the traffic element to restore the basic data of the three-dimensional road model, rebuilding the model according to the basic data of the three-dimensional model to obtain the three-dimensional road model and converting the data format of the three-dimensional model to make the three-dimensional model adapt to the specific navigation application.

Sixth Embodiment

Figure 12:
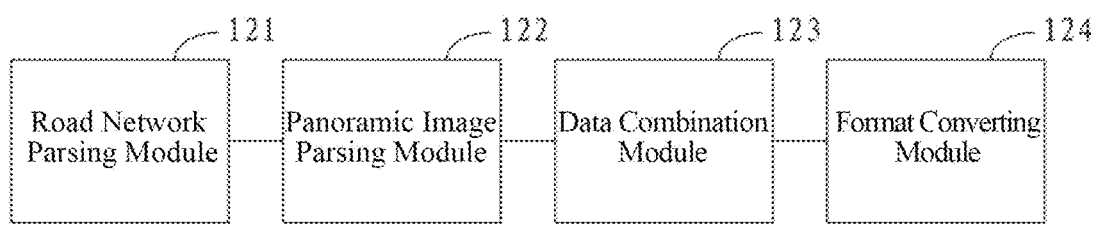
FIG. 12 is a structure diagram of a device for modelling a three-dimensional road model provided by the sixth embodiment of the present disclosure.

The present embodiment provides a technical solution for a device for modelling a three-dimensional road model. Referring to FIG. 12, in the technical solution, the device for modelling a three-dimensional road model comprises: a road network parsing module 121, a panoramic image parsing module 122 and a data combination module 123.

The road network parsing module 121 is used to parse two-dimensional road network data to establish a rudimentary road model.

The panoramic image parsing module 122 is used to parse panoramic image data to obtain three-dimensional attribute data of a traffic element.

The data combination module 123 is used to combine the rudimentary model and the three-dimensional attribute data to obtain a three-dimensional road model.

Further, the road network parsing module 121 is Specifically used to obtain a road boundary line, a median divider boundary line, a road center line, and a lane line by parsing the two-dimensional road network data.

Further, the panoramic image parsing module 122 comprises: an element obtaining unit and a position obtaining unit.

The element obtaining unit is used to obtain the traffic element in the panoramic image data using a deep-learning-based image recognition technique, the traffic element comprising: a lane line, a traffic sign, an indicating line and a traffic light.

The position obtaining unit is used to obtain position information of the traffic element in the three-dimensional space using a vision image localization technique.

Further, the element obtaining unit is Specifically used to recognize the traffic element in the panoramic image data using a deep neural network.

Further, the data combination module 123 comprises: a three-dimensional transforming unit, a position correcting unit and a rebuilding unit.

The three-dimensional transforming unit is used to transform position data in the rudimentary model into three-dimensional data using the three-dimensional attribute data.

The position correcting unit is used to correct the position data in the rudimentary model using position data into the three-dimensional attribute data.

The rebuilding unit is used to rebuild the three-dimensional model based on the combined three-dimensional data to obtain the three-dimensional model data of the road.

Further, the device for modelling a three-dimensional road model further comprises: a format converting module 124.

The format converting module 124 is used to convert the three-dimensional model data into a pre-set model data format after combining the rudimentary model and the three-dimensional attribute data to obtain the three-dimensional road model.

The above-described device for modelling a three-dimensional road model may execute the method for modelling a three-dimensional road model provided by any of the embodiments of the present disclosure and have the functional modules corresponding to the execution method and the beneficial effects.

It will be understood by the skilled in the art that each of the modules or steps of the present disclosure described above may be implemented by a general computing device which may be centralized on a single computing device or distributed over a network of a plurality of computing devices. Optionally, they may be implemented by program code executable by the computer device so that they may be stored in a storage device and executed by a computing device, or they may be separately made into respective integrated circuit modules, or a plurality of modules or steps may be implemented into a single integrated circuit module. Thus, the present disclosure is not limited to any particular combination of hardware and software.

Seventh Embodiment

A storage medium comprising computer-executable instructions executing a method for modelling a three-dimensional road model when executed by a computer processor, characterized in that the method comprising following steps:

parsing two-dimensional road network data to establish a rudimentary road model;

parsing panoramic image data to obtain three-dimensional attribute data of a traffic element; and combining the rudimentary model and the three-dimensional attribute data to obtain a three-dimensional road model.

When the above-described storage medium executes the method, the parsing two-dimensional road network data to establish a rudimentary road model comprises:

obtaining a road boundary line, a median divider boundary line, a road center line, and a lane line by parsing the two-dimensional road network data.

When the above-described storage medium executes the method, the parsing panoramic image data to obtain the three-dimensional attribute data of a traffic element comprises:

obtaining the traffic element in the panoramic image data by using a deep-learning-based image recognition technique, the traffic element comprising: a land line, a traffic sign, an indicating line and a traffic light; and obtaining position information of the traffic element in the three-dimensional space by using a vision image localization technique.

When the above-described storage medium executes the method, the combining the rudimentary model and the three-dimensional attribute data to obtain the three-dimensional road model comprises:

transforming position data in the rudimentary model into a three-dimensional form by using the three-dimensional attribute data;

correcting the position data in the rudimentary model by using position data in the three-dimensional attribute data; and performing the three-dimensional model rebuilding based on the combined three-dimensional data to obtain the three-dimensional model data of the road.

When the above-described storage medium executes the method, the method also comprises following steps:

converting the three-dimensional model data into a pre-set model data format after combining the rudimentary model and the three-dimensional attribute data to obtain the three-dimensional road model.

Through the above description about the embodiments, it will be clearly understood to those skilled in the art that the present disclosure may be implemented by means of software and necessary hardware, and naturally may be implemented by hardware, but in many cases the former is a better embodiment. Based on this understanding, the technical solution of the present disclosure essentially, or the part that contributes over the prior art may be embodied in the form of a software product, and the computer software product may be stored in a computer readable storage medium such as a hard disk, an optical disk, a read-only memory (ROM) or a random access memory (RAM), comprising a plurality of instructions for causing a computer device (which may be a personal computer, a server, or a network device, etc.) to execute the methods described in each of the embodiments of the present disclosure.

It is to be noted that in the embodiments of the device for modelling the three-dimensional road model described above, the respective modules and sub-modules are divided according to the functional logic, but the present disclosure is not limited to the above-described division, as long as the corresponding function may be achieved. In addition, the specific name of each of functional units is merely for ease of mutual distinction and is not intended to limit the scope of the present disclosure.

Each of the embodiments in this specification is described in a progressive manner, each of which primarily focuses on different parts from the other embodiments, and the same or similar parts between the various embodiments may be referred to each other.

The foregoing is only a preferred embodiment of the present disclosure and is not intended to limit the invention, it will be apparent to those skilled in the art that various changes and modifications may be made therein. Any modifications, equivalent substitutions, improvements, and the like within the spirit and principle of the present disclosure are included in the scope of the present disclosure.

What is claimed:

1. A method for modelling a three-dimensional road model, comprising:

parsing two-dimensional road network data to establish a two-dimensional rudimentary road model;

parsing panoramic image data to obtain three-dimensional attribute data of a traffic element, wherein the three-dimensional attribute data comprises three-dimensional position coordinates; and combining the rudimentary model and the three-dimensional attribute data to obtain a three-dimensional road model;

wherein the combining the rudimentary model and the three-dimensional attribute data to obtain a three-dimensional road model comprises:

transforming two-dimensional position data in the rudimentary model into three-dimensional data by using the three-dimensional attribute data, by adding height data to each position point in the rudimentary model;

correcting the two-dimensional position data in the rudimentary model by using position data in the three-dimensional attribute data; and performing a three-dimensional model rebuilding based on the three-dimensional data to obtain the three-dimensional road model.

2. The method according to claim 1, wherein the parsing two-dimensional road network data to establish a rudimentary road model comprises:

obtaining a road boundary line, a median divider boundary line, a road center line and a lane line by parsing the two-dimensional road network data.

3. The method according to claim 1, wherein the parsing panoramic image data to obtain three-dimensional attribute data of a traffic element comprises:

obtaining the traffic element in the panoramic image data by using a pre-trained deep neural network, the traffic element comprising a lane line, a traffic sign, an indicating line and a traffic light; and obtaining position information of the traffic element in the three-dimensional space by determining position information of a set of boundary points of the traffic element in the three-dimensional space.

4. The method according to claim 1, wherein the method further comprises:

converting the three-dimensional model data into a pre-set model data format for navigation after combining the rudimentary model and the three-dimensional attribute data to obtain a three-dimensional road model.

5. A device for modelling a three-dimensional road model, the device comprising:

at least one processor; and a memory storing instructions, the instructions when executed by the at least one processor, cause the at least one processor to perform operations, the operations comprising:

parsing two-dimensional road network data to establish a two-dimensional rudimentary road model;

parsing panoramic image data to obtain three-dimensional attribute data of a traffic element, wherein the three-dimensional attribute data comprises three-dimensional position coordinates; and combining the rudimentary model and the three-dimensional attribute data to obtain a three-dimensional road model;

wherein the combining the rudimentary model and the three-dimensional attribute data to obtain a three-dimensional road model comprises:

transforming two-dimensional position data in the rudimentary model into three-dimensional data by using the three-dimensional attribute data, by adding height data to each position point in the rudimentary model;

correcting the two-dimensional position data in the rudimentary model by using position data in the three-dimensional attribute data; and performing a three-dimensional model rebuilding based on the three-dimensional data to obtain the three-dimensional road model.

6. The device according to claim 5, wherein the parsing two-dimensional road network data to establish a rudimentary road model comprises:

obtaining a road boundary line, a median divider boundary line, a road center line and a lane line by parsing the two-dimensional road network data.

7. The device according to claim 5, wherein the parsing panoramic image data to obtain three-dimensional attribute data of a traffic element comprises:

obtaining the traffic element in the panoramic image data by using a pre-trained deep neural network, the traffic element comprising a lane line, a traffic sign, an indicating line and a traffic light; and obtaining position information of the traffic element in the three-dimensional space by determining position information of a set of boundary points of the traffic element in the three-dimensional space.

8. The device according to claim 5, wherein the operations further comprise:

converting the three-dimensional model data into a pre-set model data format for navigation after combining the rudimentary model and the three-dimensional attribute data to obtain a three-dimensional road model.

9. A non-transitory storage medium comprising computer-executable instructions executing a method for modelling a three-dimensional road model when executed by a computer processor, the method comprising:

parsing two-dimensional road network data to establish a two-dimensional rudimentary road model;

parsing panoramic image data to obtain three-dimensional attribute data of a traffic element, wherein the three-dimensional attribute data comprises three-dimensional position coordinates; and combining the rudimentary model and the three-dimensional attribute data to obtain a three-dimensional road model;

wherein the combining the rudimentary model and the three-dimensional attribute data to obtain a three-dimensional road model comprises:

transforming two-dimensional position data in the rudimentary model into three-dimensional data by using the three-dimensional attribute data, by adding height data to each position point in the rudimentary model;

correcting the two-dimensional position data in the rudimentary model by using position data in the three-dimensional attribute data; and performing a three-dimensional model rebuilding based on the three-dimensional data to obtain the three-dimensional road model.

* * * * *